United States Patent
Gabriel (10) Patent No.: US 6,191,686 B1
(45) Date of Patent: Feb. 20, 2001

(54) COLLISION AVOIDANCE SYSTEM FOR CARS

(76) Inventor: Edwin Z. Gabriel, 91 Mt. Tabor Way, Ocean Grove, NJ (US) 07756-1437

(*) Notice: Under 35 U.S.C. 154(b), the term of this patent shall be extended for 0 days.

(21) Appl. No.: 09/406,409

(22) Filed: Sep. 27, 1999

(51) Int. Cl.$^7$ ........................................ B60Q 1/00
(52) U.S. Cl. .................... 340/435; 340/903; 340/904; 180/169; 180/271; 293/102; 280/730.2
(58) Field of Search .................... 340/435, 903, 340/904, 436, 825.69, 825.92; 180/89.12, 169, 271; 293/131, 118, 102; 280/736, 735, 734, 730.1, 730.2

(56) References Cited

U.S. PATENT DOCUMENTS

| | | | |
|---|---|---|---|
| 5,033,569 | * | 7/1991 | Hayes ................................. 180/169 |
| 5,959,552 | * | 9/1999 | Cho .................................... 340/903 |
| 6,031,449 | * | 2/2000 | Lapote ................................ 340/436 |
| 6,106,038 | * | 8/2000 | Dreher ................................ 293/118 |

* cited by examiner

Primary Examiner—Daniel J. Wu
Assistant Examiner—Anh La (57) ABSTRACT

This application of a law in physics discloses relatively uncomplicated techniques for reducing the impact of auto collisions on our highways by providing aid to the motorist in slowing down his vehicle in time to avoid a hard collision, if such is to occur. The vehicle slows down from the blasts of high pressure air emitted from air valves in the auto's front end, producing a reaction of slowing down the vehicle. The blasts of air also aid in pushing the other vehicle out of the way so that the impact if any, would be less severe. The air valves in the auto's front end can be remotely swivable, servo driven, enabling the motorist to direct the air blasts in the direction of the menacing vehicle. The air blasts can be produced automatically from a simple calculation, providing the time in seconds for a collision to occur. If the time is less than a predetermined set value, then the air blasts are automatically turned on. In a similar manner, blasts of air at the auto's rear end can slow down the vehicle coming from behind to reduce the severity of the impact, if any. The high pressure of the blasts of air may last only a few seconds, enough time to produce the result of either reducing the impact of the collision or avoiding it altogether. A horn in the auto's rear also can warn and awaken the driver of the oncoming vehicle to slow down.

5 Claims, 4 Drawing Sheets

CONNECTIONS FOR DIVISION OF VOLTAGES

FIG.9

BASIC MULTIPLIER CONNECTIONS

COLLISION AVOIDANCE SYSTEM FOR CARS

CROSS-REFERENCES TO RELATED APPLICATIONS

This is not a continuation-in-part of a previous application, nor one that is co-pending.

RIGHTS TO INVENTIONS MADE UNDER FEDERALLY-SPONSORED RESEARCH AND DEVELOPMENT

None of the work on this invention was performed under any Federally-Sponsored or State-Sponsored research and development. Gabriel used his own resources on every phase of his project.

BACKGROUND OF THE INVENTION

Field of the Invention

This invention is in the field of the avoidance of auto accidents. Most recent auto accident devices are for protecting the driver and passenger after an accident has occurred, such as seat belts and air bags. Horns and brakes have been on cars since their conception for avoiding accidents, but other accident preventive devices have not been introduced and added to autos. Other items that help reduce auto accidents are running headlights and day/night mirrors to take the glare off of the mirror. Reflectors and light-colored cars make them more visible at night, but they do not prevent an accident from happening by an inattentive driver. In the present invention, a warning sound may automatically occur and if that is not enough, blasts of high pressure air occur to both slow down one's vehicle and help push the other vehicle out of the way, so that even if a collision were to occur, the impact would be less severe than otherwise it might have been.

SUMMARY OF THE INVENTION

With today's high traffic and high speed auto travel conditions, attention needs to be given to collision avoidance as well as collision warning devices.

To avoid collisions between two light-weight autos, sensors with calculators may be used to measure the distances between the autos traveling on the road and their relative speeds to each other. To avoid a collision, the time for impact between the two autos is computed. In the automatic system, if the time falls below a pre-determined value, a relay closes a circuit, applying voltage to one or more solenoid-operated air valves. The energized solenoids open their valves, allowing blasts of air to be emitted at their outlet ports. The blasts of air perform two functions—one to slow down the auto with the devices and two, to push the other vehicle in front ahead or forward so a collision would not occur. Simultaneously, the driver of the first auto could slam on his brakes to first slow down his auto. If a collision should occur, it now would be a softer impact than if the system were not in operation. In case the driver wishes to by-pass the speed and distance sensors with their calculators, he may do so by closing a switch manually, thus causing blasts of air to occur immediately.

In addition, the driver of the first car may be concerned about a rear-end collision from an auto overtaking his own car from the rear, then he could blow his rear-end car horn, as a warning, while also causing blasts of air to occur at his auto's rear-end, thus helping to prevent his car from a rear-end collision. At night, he could turn on rear red headlights, to warn the car speeding toward him that blasts of air will be blown at the approaching car to either avoid a collision or soften the collision, if inevitable. As many of these collision avoidance devices as desired would be installed in cars for owners wishing to have the ultimate in safety equipment, even if the auto's appearance may be impaired by the devices.

BRIEF DESCRIPTION OF DRAWINGS

For the purpose of illustrating the collision avoidance techniques described, the following drawings show forms which are presently preferred. It is to be understood that this invention is not necessarily limited to the precise arrangement, instrumentalities and field of utility as therein demonstrated.

DESCRIPTION OF A PREFERRED EMBODIMENT

Figure 1:
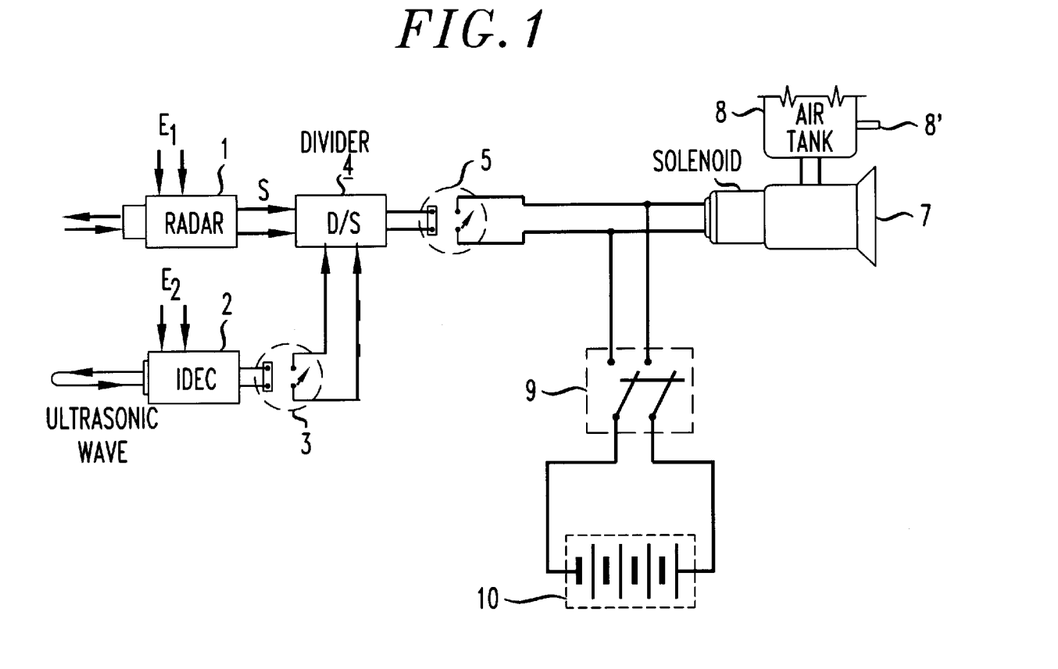
FIG. 1 is a block diagram of the anti-collision system, including the auto speed and distance between cars sensors, the dividers, the normally-open relay, the solenoid-operated air valve and the compressed air tank.

The collision avoidance system is shown in block diagram form in FIG. 1. The components within the blocks are mounted on or near the auto's front-end. Radar speed gun 1, mounted near the car's front end measures speeds of the car ahead and provides an output voltage proportional to the difference between the speeds of the two cars. Simultaneously, a distance sensor and computer 2 measures distance "D", the distance between the two cars and applies to voltage via relay 3, to an analog electronic divider circuit 4 at the same time that the radar gun applies its output analog voltage with the proper scale factor applied to the divider circuit. The divider circuit divides "D" by "S" to obtain the time required for a collision to occur. If the time is below a predetermined number of seconds, relay 6 closes the circuit for voltage to be applied to Solenoid-operated air valve 7. Compressed air from tank 8 enters valve 7 and blasts out its outlet port to help slow down one's own car, also helping push the car ahead, so that if an impact is to occur, it would be soft and not demolish the car ahead. At the same time the air blast is occurring the driver of the car is applying his brakes to help slow down his car.

At any time, the driver of the car could by-pass the speed and distance sensors and apply voltage from voltage supply 10 to close solenoid-operated valve 7, via manual switch 9. The blast of air would endure as long as switch 9 is closed, but the intensity of the blast would diminish with time, unless the pressure within the tank is maintained, via its air inlet valve 8', connected to an air compressor, not shown.

Figure 2:
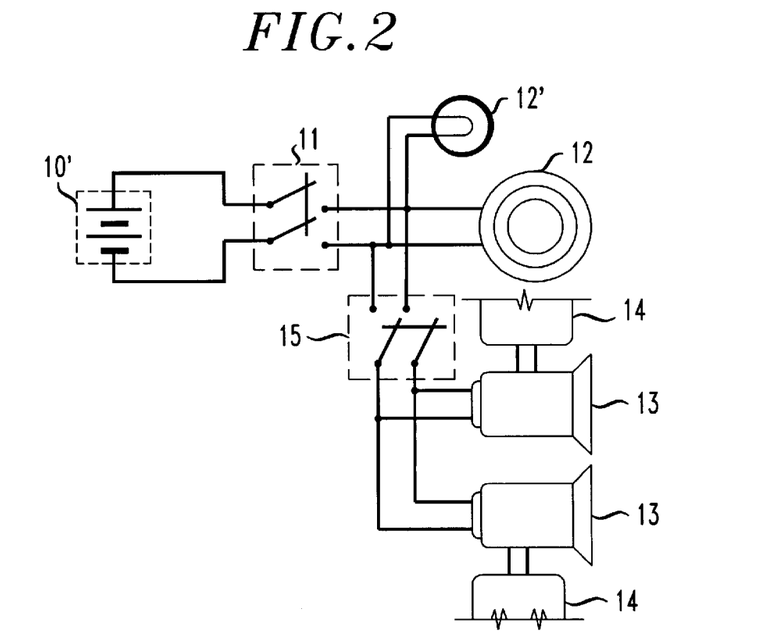
FIG. 2. is another block diagram of the anti-collision system, for the auto's rear-end, including a horn or siren, a bright red head-light, solenoid-operated air valves with connected compressed air tanks.

FIG. 2 shows a block diagram of components for collision avoidance for the auto's rear. Voltage supply 10' supplies energy to rear horn 12 via manual switch 11. When one is concerned about a rear end accident, one blows the rear horn. Voltage supply 10' could also supply energy for a rear-mounted air valves 13 connected to compressed air tanks 14. Switch 15 could be either open or closed, depending whether one wants to have the air blast to occur simultaneously with the horn blowing or not.

Figure 3:
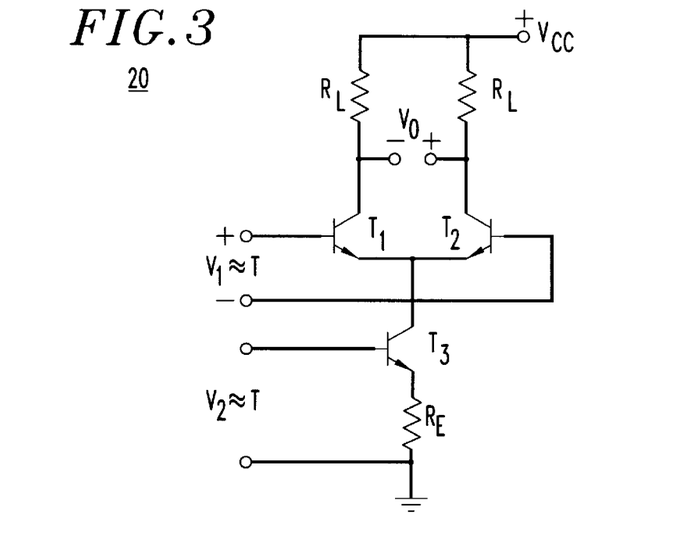
FIG. 3 is an analog circuit for the multiplier, with two inputs and an output, though multipliers are available off-the-shelf from Burr-Brown.

FIG. 3 is an analog multiplier circuit with three NPN transistors $T_1$, $T_2$ and $T_3$, resistors RL and RE. Its output is $V_0$ and its two inputs are $V_1$ (for speed S) and $V_2$ (for Time T). This suggested circuit is from page 222, FIG. 7.2, textbook entitled "Analog Integrated Circuit Design" by Alan B. Grebene.

Figure 4:
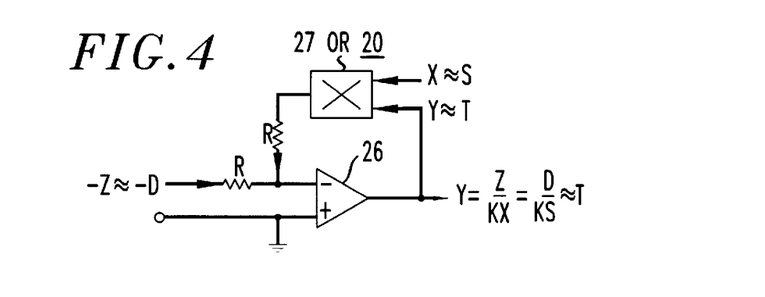
FIG. 4 shows a block diagram of an electronic analog divider circuit showing voltages corresponding to distance and speed as input voltages, while the voltage corresponding to time is its output.

FIG. 4 is the application of multiplier, FIG. 3, to a divider circuit to provide the voltage equivalent to time. This circuit divides distance D by speed S to obtain Time T, in volts. Multiplier 20 is connected in the feedback circuit of FIG. 4, as shown. Output voltage, $$V_0 = \frac{V_1 V_2 \cdot R_L}{R_E V_T},$$

where thermal voltage $V_T = KT/q$, where
K=Boltzmann's constant, $1.38 \times 10^{-23}$ joule/molecule
T=Temp. in °K (Kelvin)
q=electronic charge Analog multipliers also are available, off-the-shelf, such as MPY634, a four-quadrant analog voltage multiplier, from Burr-Brown, P.O. Box 11480, Tucson, Ariz. 85734, and AD534 with an error of ±2% Max., from Analog Devices Inc, Norwood, Mass.

Figure 8:
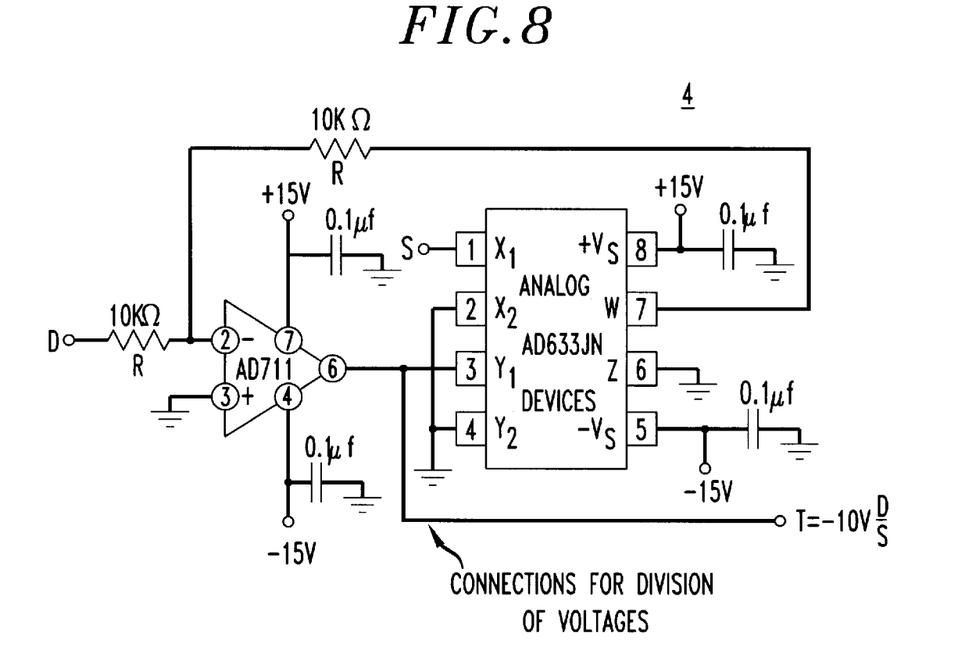
FIG. 8 shows two analog integrated circuit packages with connections for division of voltages representing speed and distance.

Solenoid valves 7, shown in FIGS. 1 and 2 are available off-the-shelf in different sizes from Air-Mite Devices, Inc, 4739 W. Montrose Ave., Chicago, Ill. 60641, such as the Rotoram Valve V3313S, with spring return and ⅜ inch NPT. High pressure air tanks 8, FIG. 1, and 14, FIG. 2, are available in different sizes from several sources, including Compressed Gas Assoc., 1725 Jefferson Davis Hwy, Arlington, Va. 22202, and Press Steel, Catalina Cylinders, Div. of Aluminum Precision Products, Inc., 7300 Anaconda Ave, Garden Grove, Calif. 92841. In FIG. 4, numeral 27 has its lead line pointing to an intergrated circuit operational amplifier 26, such as an AD 711, shown in FIG. 8.

The proper scale factors need to be applied between interconnecting components, such as between the radar gun output voltage and analog voltage divider and between the distance sensor and calculator output voltage and the analog voltage divider so the divider's output voltage will have been correctly computed to provide a voltage equivalent to the correct time in seconds, to be applied to relay 6, FIG. 1.

Figure 5:
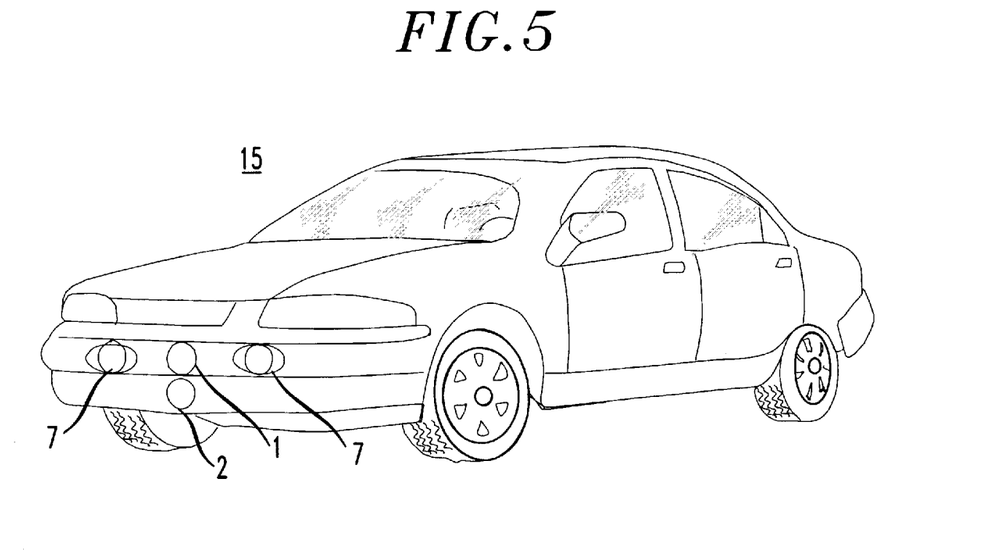
FIG. 5 is a picture of the front and side ends of an auto with suggested locations for collision-preventive devices.

FIG. 5 shows the front and side of an auto 15 and a suggested location for two solenoid-operated air valves 7 and this circuit is identified as 20 radar gun 1. Between the two head lights would be a desirable location. The radar gun could be located in the center of the air grill. The air grill could be moved above where the hood is. The appearance of the auto's front may be impaired for the sake of improved safety. Compressed air tank 8 could be located underneath the auto where space is available.

Figure 6:
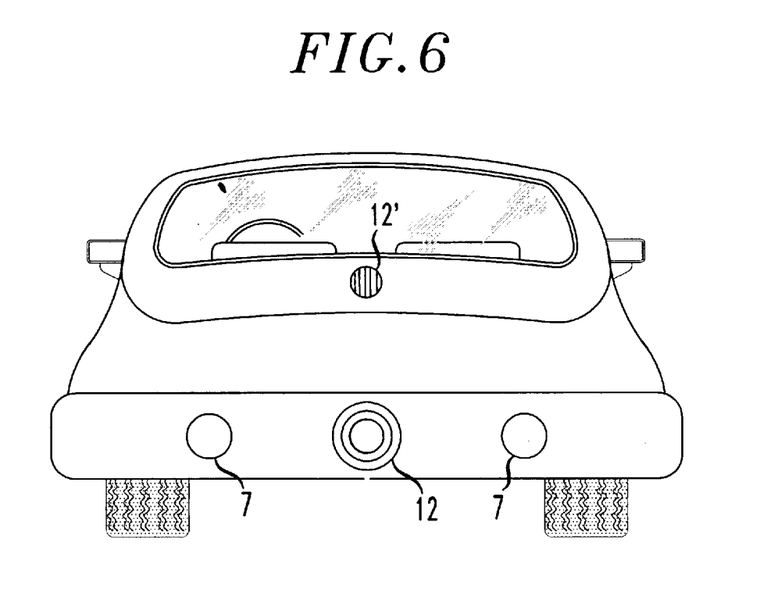
FIG. 6 is a picture of the rear-end of an auto with suggested locations for rear-end collision-preventive devices.

FIG. 6 shows the rear-end of auto 15 and a suggested location for two solenoid-operated air valves 7, horn 12 and an additional red light 12. The compressed air tank 14 would be located inside the trunks. The appearance of the auto's rear may be slightly impaired at the expense of improved safety. Certain individuals would prefer improved safety to impairment in the car's appearance.

For the outlet ports of the air valve to focus on an oncoming menacing vehicle, it would be desirable for the air valves to rotate, be swingable, in the direction of the oncoming vehicle, threatening one's own vehicle. This is accomplished by adding an electromechanical servo positioning system whose output shaft would position the outlet port, either right or left or straight ahead, depending on the direction of the on-coming menacing vehicle. One also could focus the outlet ports in the direction of an obstruction, either moving or stationary. One could have two input actuating devices, each to control the angular position of an air valve. If one wished to focus on, say, a tree ahead, one would turn the actuating input devices, say knobs, in the direction of the tree. This actuation of input devices could be performed automatically by an eye-pointing, head-tracking automatic control system, which Mr. Gabriel invented about 1975.

Figure 7:
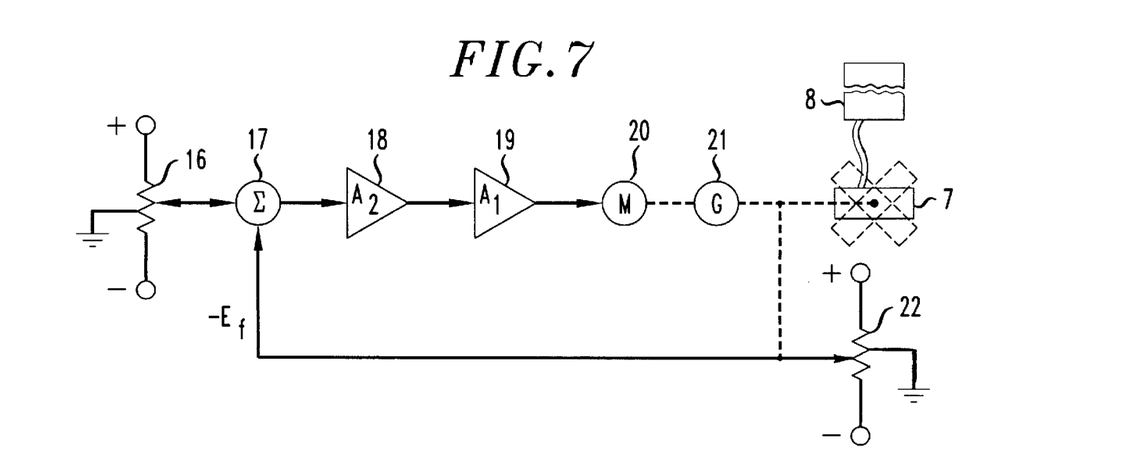
FIG. 7 is a schematic diagram of an electromechanical servo positioning system for the air valves in front of the auto.

In FIG. 7, the position-control servomechanism has an input bi-polar positioning potentiometer 16, whose output $E_1$ is applied to a summing network 17. The summer's output, the error signal, is applied to a voltage amplifier, 18. Then the amplifier signal is applied to a power amplifier 19, whose output has sufficient energy to drive a dc motor 20; the motor shaft's speed is reduced appreciably by a gear train 21 and its output drives a potentiometer 22, identical with input potentiometer 16. The output shaft of the gear train 21 also turns the outlet port of valve 7 in the desired direction to directly face the obstruction or moving vehicle ahead; in order to blast air on that object. The theory and the mathematical analysis of position control servomechanisms are well known, so they will not be repeated here. The mechanisms may be obtained off-the-shelf from Manufacturers, such as Servo Systems Co., Montville, N.J. Because tank 1 may be a foot or more away from the air valve, high pressure flexible hose is suggested to connect the outlet of tank 1 to the inlet of air valve 7.

Figure 9:
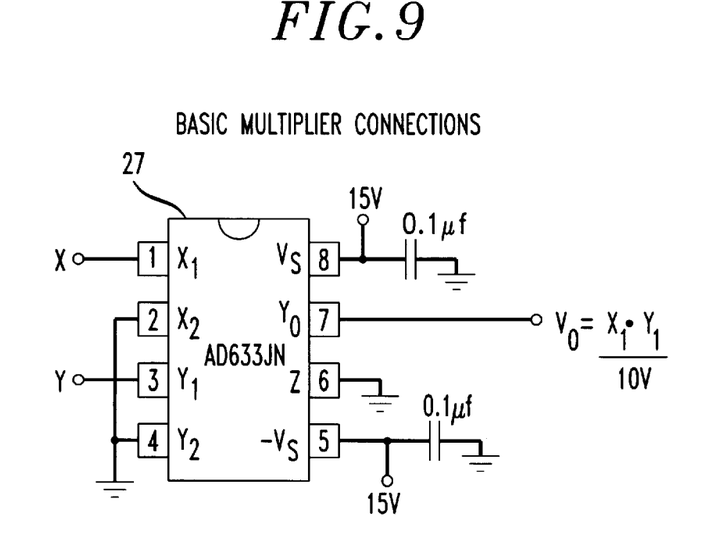
FIG. 9 shows an analog integrated circuit package with connections for multiplying two volages, as a substitute for the multiplier circuit shown in FIG. 3.

The analog multiplier circuit shown in FIG. 3 comes in an integrated circuit package, plastic, 8-pin plastic DIP. It is identified as AD633JN by Analog Devices, Norwood, Mass. This IC package is provided in FIG. 9. The analog Divider diagram in FIG. 4 also comes in integrated circuit (IC) packages, shown in FIG. 8, as AD711 and AD633JN, from Analog Devices. To save time in making the electrical connections for FIG. 1, these of-the-shelf IC packages are recommended. This IC package is identified as 27, FIG. 9.

It is true that the signature of a man is different from that of a car, but the sensors for speed and distance could be adjusted to recognize both.

What is claimed is:

1. A vehicle-collision prevention system wherein a first vehicle has four sides, including front and rear sides, with one or more of its sides provided with solenoid-operated air valves with inlet and outlet ports, compressed air tanks and a manually-operated switch, a circuit also including a voltage supply, each of said air valves being connected to a compressed air tank with piping, with all solenoids being connected in parallel with the same, single voltage supply, and in series with said switch, preferably having said air valves mounted on said front side; when said switch being closed, all air valves are opened to blast high pressure air out of said front side of said vehicle to provide a cushion behind another second vehicle traveling along the road ahead, with which said first vehicle may collide; a sufficient number and size of air valves with sufficient air pressure being provided to offer the needed air cushion to avoid a hard collision; the air blasts from said valves both causing said-first vehicle to slow down and pushing said second vehicle ahead and out of the way.

2. A vehicle-collision prevention system in accordance with claim 1, wherein a vehicle speed calculator and a distance between vehicles sensor measuring calculator are provided to enable the system to operate automatically in order to avoid an impending collision, said speed calculator being a radar speed sensor with a voltage supply and said distance senor measuring calculator being an ultrasonic distance sensor; a voltage equivalent to the distance measured between two vehicles being divided by a voltage equivalent to the relative speed between the two vehicles for obtaining the time required for the first vehicle to overtake the second vehicle, then if the voltage equivalent to the calculated time is the same or below a predetermined value, an electrically-connected relay closing the circuit to the solenoids of the solenoid-operated air valves, allowing high pressure air from said tank to blast air through at the front side of said first vehicle, slowing it down.

3. A vehicle-collision prevention system in accordance with claim 1, wherein a horn and additional said solenoid-operated air valves are mounted on the rear side of said first vehicle, with compressed air tanks connected to their inlet ports with piping; a voltage supply being electrically connected to both said horn mounted on its rear side and the solenoids of said air valves, via two switches, so that either the rear horn may blow to warn a vehicle behind, or both the horn blowing and the air blasts occurring to both slow down the vehicle behind and push said first vehicle forward, one of said two switches closing the circuit for said rear horn to blow, the second of said two switches closing the circuits to said solenoid-operated air valves mounted on said rear side, to allow high pressure air to blast out their outlet ports.

4. A vehicle-collision prevention system in accordance with claim 1 and wherein said air valves are swivable about pivots and wherein remotely-controlled means being provided for rotating said valves within prescribed limits about said pivots, said means being an electromechanical serve positioning system comprising an input potentiometer, a resistor summing network, providing an error signal, applied to a voltage amplifier, then to a power amplifier, a dc electric motor, a gear speed reducer with an output shaft, connected both to the and to the shaft of a second potentiometer whose output voltage being fed back to said resistor summing network, to provide said error signal, thus enabling the driver of said vehicle to have air valve outlets pointing toward an oncoming menacing vehicle.

5. A vehicle-collision prevention system in accordance with claim 2, wherein a potentiometer being added in an input excitation circuit of said electrically-connected relay, one which normally closes a solenoid circuit with insufficient voltage, with said potentiometer set for minimum resistance in said input excitation circuit, to allow the time for impact between said first and second vehicles to be for higher speed, as more output voltage from a divider circuit being available to keep said relay circuit open; with said potentiometer set for maximum resistance in a input circuit, to allow the time for impact between said first and second vehicles to be for a lower speed, as more output voltage from said divider circuit being available, thus enabling said solenoid circuit to close at the same time as for said higher speed.

* * * * *

UNITED STATES PATENT AND TRADEMARK OFFICE
CERTIFICATE OF CORRECTION

PATENT NO. : 6,191,686 B1  Page 1 of 4
DATED : February 20, 2001
INVENTOR(S) : Edwin Z. Gabriel It is certified that error appears in the above-identified patent and that said Letters Patent is hereby corrected as shown below:

Column 2,
Line 63, after "relay", delete "6" and substitute -- 5 --.

Column 3,
Line 3, after end of sentence, add sentence, -- Output circuit of relay 5 has voltage supply in series having the same voltage and current capacity as voltage supply 10. --.

Drawings,
Fig. 1, add voltage supply E, where indicated in relay 5 output cicuit, both in the title page and in Fig. 1.
Fig. 6, delete numeral 7 with lead lines pointing to circles and substitute numeral 13.
Fig. 1, add potentiometer 5' at input circuit of relay 5, as shown.
Fig. 1, add voltage supply in output circuit "D" of relay 3, as shown.

Title page,
Showing illustrative figure, should be deleted and replace with attached Title page.

Signed and Sealed this

Eighth Day of January, 2002

*Attest:*

JAMES E. ROGAN
*Attesting Officer*   *Director of the United States Patent and Trademark Office*

(12) United States Patent
Gabriel (10) Patent No.: US 6,191,686 B1
(45) Date of Patent: Feb. 20, 2001

(54) COLLISION AVOIDANCE SYSTEM FOR CARS

(76) Inventor: Edwin Z. Gabriel, 91 Mt. Tabor Way, Ocean Grove, NJ (US) 07756-1437

(*) Notice: Under 35 U.S.C. 154(b), the term of this patent shall be extended for 0 days.

(21) Appl. No.: 09/406,409

(22) Filed: Sep. 27, 1999

(51) Int. Cl.[7] ................................................ B60Q 1/00
(52) U.S. Cl. .................... 340/435; 340/903; 340/904; 180/169; 180/271; 293/102; 280/730.2
(58) Field of Search ............................ 340/435, 903, 340/904, 436, 825.69, 825.92; 180/89.12, 169, 271; 293/131, 118, 102; 280/736, 735, 734, 730.1, 730.2

(56) References Cited

U.S. PATENT DOCUMENTS

| | | | |
|---|---|---|---|
| 5,033,569 | * 7/1991 | Hayes | 180/169 |
| 5,959,552 | * 9/1999 | Cho | 340/903 |
| 6,031,449 | * 2/2000 | Lapote | 340/436 |
| 6,106,038 | * 8/2000 | Dreher | 293/118 |

* cited by examiner

Primary Examiner—Daniel J. Wu
Assistant Examiner—Anh La (57) ABSTRACT

This application of a law in physics discloses relatively uncomplicated techniques for reducing the impact of auto collisions on our highways by providing aid to the motorist in slowing down his vehicle in time to avoid a hard collision, if such is to occur. The vehicle slows down from the blasts of high pressure air emitted from air valves in the auto's front end, producing a reaction of slowing down the vehicle. The blasts of air also aid in pushing the other vehicle out of the way so that the impact if any, would be less severe. The air valves in the auto's front end can be remotely swivable, servo driven, enabling the motorist to direct the air blasts in the direction of the menacing vehicle. The air blasts can be produced automatically from a simple calculation, providing the time in seconds for a collision to occur. If the time is less than a predetermined set value, then the air blasts are automatically turned on. In a similar manner, blasts of air at the auto's rear end can slow down the vehicle coming from behind to reduce the severity of the impact, if any. The high pressure of the blasts of air may last only a few seconds, enough time to produce the result of either reducing the impact of the collision or avoiding it altogether. A horn in the auto's rear also can warn and awaken the driver of the oncoming vehicle to slow down.

5 Claims, 4 Drawing Sheets

FIG.5

FIG.6

UNITED STATES PATENT AND TRADEMARK OFFICE
CERTIFICATE OF CORRECTION

PATENT NO. : 6,191,686 B1 Page 1 of 4
APPLICATION NO. : 09/406409
DATED : February 20, 2001
INVENTOR(S) : Edwin Z. Gabriel It is certified that error appears in the above-identified patent and that said Letters Patent is hereby corrected as shown below:

Title page, showing illustrative figure, should be deleted and replace with attached Title page.

Col. 2, line 63, after "relay", delete "6" and substitute --5--.
Col 3, line 3, after end of sentence, add sentence, --Output circuit of relay 5 has voltage supply in series having the same voltage and current capacity as voltage supply 10.--.

In the drawings:
In Fig. 1, add voltage supply E, where indicated in relay 5 output circuit, both in the title page and in Fig. 1.
In Fig. 1, add potentiometer 5' at input circuit of relay 5, as shown.
In Fig. 1 add voltage supply in output circuit "D" of relay 3, as shown.
In Fig. 6, delete numeral 7 with lead lines pointing to circles and substitute numeral 13.

Signed and Sealed this

Eleventh Day of September, 2007

JON W. DUDAS
*Director of the United States Patent and Trademark Office*

(12) United States Patent
Gabriel (10) Patent No.: US 6,191,686 B1
(45) Date of Patent: Feb. 20, 2001

(54) COLLISION AVOIDANCE SYSTEM FOR CARS

(76) Inventor: Edwin Z. Gabriel, 91 Mt. Tabor Way, Ocean Grove, NJ (US) 07756-1437

(*) Notice: Under 35 U.S.C. 154(b), the term of this patent shall be extended for 0 days.

(21) Appl. No.: 09/406,409

(22) Filed: Sep. 27, 1999

(51) Int. Cl.$^7$ ............................................. B60Q 1/00
(52) U.S. Cl. .................... 340/435; 340/903; 340/904; 180/169; 180/271; 293/102; 280/730.2
(58) Field of Search .............................. 340/435, 903, 340/904, 436, 825.69, 825.92; 180/89.12, 169, 271; 293/131, 118, 102; 280/736, 735, 734, 730.1, 730.2

(56) References Cited

U.S. PATENT DOCUMENTS

| | | | |
|---|---|---|---|
| 5,033,569 | * 7/1991 | Hayes | 180/169 |
| 5,959,552 | * 9/1999 | Cho | 340/903 |
| 6,031,449 | * 2/2000 | Lapote | 340/436 |
| 6,106,038 | * 8/2000 | Dreher | 293/118 |

* cited by examiner

Primary Examiner—Daniel J. Wu
Assistant Examiner—Anh La (57) ABSTRACT

This application of a law in physics discloses relatively uncomplicated techniques for reducing the impact of auto collisions on our highways by providing aid to the motorist in slowing down his vehicle in time to avoid a hard collision, if such is to occur. The vehicle slows down from the blasts of high pressure air emitted from air valves in the auto's front end, producing a reaction of slowing down the vehicle. The blasts of air also aid in pushing the other vehicle out of the way so that the impact if any, would be less severe. The air valves in the auto's front end can be remotely swivable, servo driven, enabling the motorist to direct the air blasts in the direction of the menacing vehicle. The air blasts can be produced automatically from a simple calculation, providing the time in seconds for a collision to occur. If the time is less than a predetermined set value, then the air blasts are automatically turned on. In a similar manner, blasts of air at the auto's rear end can slow down the vehicle coming from behind to reduce the severity of the impact, if any. The high pressure of the blasts of air may last only a few seconds, enough time to produce the result of either reducing the impact of the collision or avoiding it altogether. A horn in the auto's rear also can warn and awaken the driver of the oncoming vehicle to slow down.

5 Claims, 4 Drawing Sheets

FIG.5

FIG.6